United States Patent [19]
Agati et al.

[11] 3,757,191
[45] Sept. 4, 1973

[54] STEPPING MOTOR CONTROL CIRCUIT

[75] Inventors: Roberto A. Agati; Fabrizio O. Castoldi, both of Milan; Dario A. Mazzucco, Corsico, all of Italy

[73] Assignee: Honeywell Information Systems Italia, Milan, Italy

[22] Filed: Feb. 14, 1972

[21] Appl. No.: 225,924

[30] Foreign Application Priority Data
Feb. 22, 1971 Italy.............................. 20854 A/71

[52] U.S. Cl.................. 318/685, 318/685, 318/254, 318/138
[51] Int. Cl. ........................................... G05b 19/40
[58] Field of Search.................... 318/696, 685, 254, 318/459, 138

[56] References Cited
UNITED STATES PATENTS
| | | |
|---|---|---|
| 3,423,658 | 1/1969 | Barrus................................ 318/696 |
| 3,374,410 | 3/1968 | Cronquist et al. ............... 318/254 X |
| 3,660,746 | 5/1972 | Milek................................... 318/696 |
| 3,588,661 | 6/1971 | Newell................................ 318/696 |
| 3,644,812 | 2/1972 | Bitto ................................... 318/254 |
| 3,345,547 | 10/1967 | Dunne ................................ 318/696 |
| 3,466,520 | 9/1969 | Aylikci et al. ....................... 318/696 |
| 3,328,658 | 6/1967 | Thompson.......................... 318/415 |

Primary Examiner—G. R. Simmons
Attorney—Aubrej C. Brine et al.

[57] ABSTRACT

A device is provided for controlling a stepping motor used in printing apparatus for data processing systems. The device includes a generator of primary pulses which are correlated to the rotational position of the rotor, timing means for applying additional pulses at predetermined intervals for suitably chosen primary pulses. The timing means is effective to command switching of the current pulses energizing the motor windings by selected pulses for providing an initial acceleration stage, a subsequent braking stage, a neutral stage, and a final holding stage.

6 Claims, 7 Drawing Figures

STEPPING MOTOR CONTROL CIRCUIT

BACKGROUND OF THE INVENTION

The present invention relates to a device for controlling stepping motors, and more particularly, stepping motors used in printing apparatus for data processing systems.

Stepping motors are at present very well known, and largely employed whenever it is required to control the travel of a movable member from a first to a second position, chosen at will from a discrete set of consecutive stop positions. It is convenient to distinguish the case of the movable member moving from a position to the immediately following one, resting for a finite time, however short, in each position, and repeating the process, if so required, a number of times (step-by-step travel) from the case of the movable member travelling rapidly from a start position to an arrival position without stopping (rapid travel, or "slew"). Accordingly, the motion of the stepping motor controlling the movable member is, in the first case, a step-by-step rotation, in the second case, a rapid, or slew, rotation.

In both cases the operation of the motor is obtained by means of current pulses of proper duration energizing in succession at proper intervals selecting windings of the motor. According to the sequences of energized windings, accelerating torques, braking torques or holding torques are generated, the holding torques being such, as to maintain the rotor in a stable position.

In some instances the sequence of energizing pulses is controlled independently from the rotation of the motor ("open-loop" control). However, it is usually convenient to let the motor control, by its very motion, the switching of the energizing current pulses, by means of control pulses provided, for example, by a photoelectric device comprising a photodisk mounted on the rotor shaft, and one or more photoemitter-photodetector arrangements well known in the art. The sequence of control pulses supplied by the photoelectric device depends on the sequence of rotational positions of the rotor, and thus a position feed-back effect is obtained ("closed-loop" control).

Usually, the last steps of a slew travel are accomplished step-by-step, to make sure that the movable member stops at the right position. According to some prior art devices, switching from the slew mode to the step-by-step mode is controlled by the measure of the duration of a whole step.

This method of speed control is hardly capable of providing the precision required at high speed of operation.

In the case of step-by-step travel it is important to reach, for each step, the maximum travel speed, together with a smooth and precise stopping at the stop position, avoiding any oscillating motion. Attempts have been made to reach such a result by mechanical damping or locking means, which are clearly inadequate. Also, attempts have been made to achieve the above result by introducing a sequence of accelerating, braking and holding stages controlled by a plurality of delay means, independently of the rotational position of the motor. Even this method does not give satisfactory results.

The main object of the invention is therefore to provide a control device for a stepping motor, capable of developing the maximum travel speed together with maximum stopping precision, equally suitable for slew or step-by-step travel, and for both directions of the motion.

SUMMARY OF THE INVENTION

This object is attained by providing a generator of primary pulses, correlated to the rotational position of the rotor, and at least a timing means for supplying additional pulses at predetermined time intervals from suitably chosen primary pulses, and to command the switching of the current pulses energizing the motor winding, by means of pulses selected therefrom, under control of circuital means providing for an initial acceleration stage, at least a subsequent braking stage, possibly a neutral stage during which no current is fed to the motor, and a final holding stage. The means for generating the primary pulses is preferably a photodisk provided with at least a concentric track of transparent windows, separated by opaque sectors, and cooperating with photoemitting and photo-detecting electronic means to supply the primary pulses corresponding to the transitions of the photodetecting means from the illuminated to the obscured state, and vice versa.

Preferably, the elementary travel step, that is, the distance between two consecutive stop positions of the movable member, may comprise a number of elementary rotor steps, corresponding to the minimum angular distance between subsequent positions of stable equilibrium for the rotor. To avoid the accidental stopping of the rotor in a stable position intermediate between two consecutive stop positions, the photoelectric device is so arranged, that the permanence of the rotor in a stable position not corresponding to an allowed stop position causes the photodetector to remain in a state of illumination, or of obscurity, opposite to the state corresponding to a correct stop position.

BRIEF DESCRIPTION OF THE DRAWINGS

A preferred embodiment of the invention is described with reference to the attached drawings, in which.

DESCRIPTION OF A PREFERRED EMBODIMENT

Figure 1:
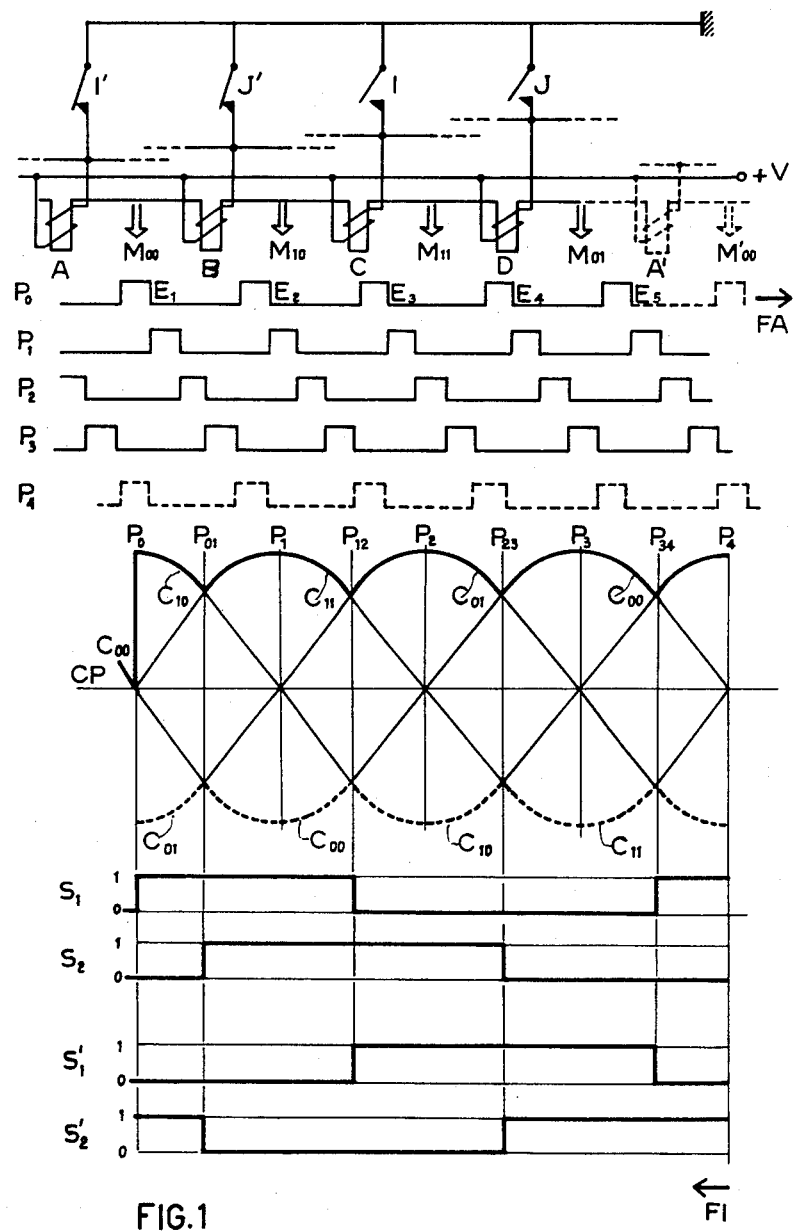
FIG. 1 depicts schematically and in rectilinear arrangement the stator windings, the sequence of positions of the rotor poles, the control signals, and the waveforms of the torques acting on the rotor, for a sector of a stepping motor of known type.

The present description of the invention considers a stepping motor having a permanent magnet rotor and four windings, energized in sequence, that is, a four-phase motor. In FIG. 1 is shown a schematic representation, in rectilinear form, of a sector of a such motor, comprising four elementary rotor steps. It is apparent that the drawing does not show the actual constructive and technical disposition, being a purely schematical representation. However, this representation is suitable for clearly explaining the modes of energizing sequences required for the different modes of operation. The represented sector is intended to be in reality arranged along a circumference of suitable radius and to be repeated as many times as needed to complete the whole circle.

Within the sector, four stator polepieces A, B, C, D, are shown, each one provided with a winding, one end of each winding being connected to a common terminal fed by a positive voltage source +V, and each one of the other ends being connected to a switch, which may connect it to, or insulate it from, a common ground terminal according to the "closed" or "open" condition of the four switches indicated by the reference letters I, J, I', J'. The drawing also shows, in dashed line, the polepiece A' of the adjacent sector, following the first one in respect to the direction of rotation shown by the arrow FA. It is understood that the energizing of all the windings associated with the equally located polepieces of the remaining sectors, such as A and A', is controlled by the same switch, and that switches I and I', and J and J', are operated in a complementary way. That is, when I is open, I' is closed, when J is open, J' is closed, and vice versa.

If two binary variables $a$ and $b$ are chosen to represent respectively the state of switches I and J, letting the binary ZERO value correspond to the open state, and the binary ONE value represent the closed state, the following table indicates, in section 1, the four possible conditions, in section 2, the four corresponding combinations of binary values for variabes $a$ and $b$; and in section 3, the combinations of states of the switches I, I', J and J'. The sequence of code combinations is the one known as "Gray's code" wherein each code combination differs from the preceding one by a single bit value.

Section 4 shows the conditions of energization (indicated by +) or de-energization (indicated by 0) of the polepieces, derived from the states of the switches, as shown in section 3.

| 1 | 2 | | 3 | | | | 4 | | | | |
|---|---|---|---|---|---|---|---|---|---|---|---|
| Cond. | a | b | I | J | I' | J' | A | B | C | D | A' |
| 1 | 0 | 0 | 0 | 0 | 1 | 1 | + | + | 0 | 0 | + |
| 2 | 1 | 0 | 1 | 0 | 0 | 1 | 0 | + | + | 0 | 0 |
| 3 | 1 | 1 | 1 | 1 | 0 | 0 | 0 | 0 | + | + | 0 |
| 4 | 0 | 1 | 0 | 1 | 1 | 0 | + | 0 | 0 | + | + |

In the initial condition 1, the polepieces A and B are energized. As all polepieces are energized in the same direction, instead of polepieces A and B a virtual magnetic pole in the intermediate position $M_{00}$ may be considered. Passing from condition 1 to the following conditions 2, 3 and 4, this virtual magnetic pole (of North polarity, for example) goes over to positions respectively $M_{10}$, $M_{11}$, $M_{01}$.

Each one of these displacements covers an elementary rotor step. Reverting to condition 1 originates the magnetic pole $M'_{00}$ corresponding to $M_{00}$. Therefore, the virtual North pole during a complete energization cycle, covers the whole sector, in four rotor steps.

The drawing also shows the four positions of the rotor in each one of the four energizing conditions.

In the considered sector, the rotor has five pole pieces $E_1 \ldots E_5$, of the same (South) magnetic polarity, obtained by means of a permanent magnet included in the rotor. It is known in the art to provide all the rotor polepieces cooperating with a given stator polarity which are of the same polarity opposed to that of the stator polepieces; it may be mentioned, for example, that the rotor may comprise a second set of polepieces of opposite polarity, displaced axially with respect to the first set, and cooperating with a set of properly wound stator windings, the permanent magnet being arranged in an axial direction between the two sets. Therefore, it is sufficient to consider the behavior of the rotor and stator polepieces shown in FIG. 1.

In condition 1, the North magnetic pole in position $M_{00}$ is directly facing the rotor polepiece $E_1$ which has South polarity, and therefore holds the rotor in position $P_0$. Going over to condition 2, the magnetic pole goes into position $M_{10}$ and attracts the polepiece $E_2$ applying a torque in the direction of arrow FA. When the rotor polepiece $E_2$ has rotated by one step and is in front of pole $M_{10}$ the rotor is in the position indicated by diagram $P_1$. When the conditions 3 and 4 are reached in succession, the rotor goes over by subsequent steps into the positions indicated by $P_2$ and $P_3$. Finally restoring condition 1, the rotor goes into the position depicted by diagram $P_4$, having accomplished four elementary rotor steps, $P_r$, during a complete energizing cycle.

Consider now the torque applied by a virtual magnetic pole to the rotor, as a function of the angular position of the same. It appears, that the waveform of said torque is repeated at angular intervals equal to four rotor steps. In diagram CP the angular distances are brought on the horizontal axis, extending to four rotor steps, and the torques applied by each virtual pole to the rotor are brought on the vertical axis, assuming the torque directed along the arrow FA as positive. It may be seen that in position $P_0$ the torque $C_{00}$ due to the pole $M_{00}$ is null with a negative derivative, and therefore $P_0$ is in a condition of stable equilibrium because a small displacement from $P_0$ produces a torque opposing the displacement. In position $P_1$, the torque reaches a negative maximum; in position $P_2$ the torque is null, with a positive derivative, which corresponds to a condition of unstable equilibrium. In position $P_3$ the torque reaches the positive maximum, and in position $P_4$ the stable equilibrium condition is resumed. The diagrams of the torques $C_{10}$, $C_{11}$, $C_{01}$, produced by the virtual poles $M_{10}$, $M_{11}$, $M_{01}$, are the same as that of torque $C_{00}$ but are shifted by a rotor step with respect to it. It may be seen that for each of these torques the maximum positive torque is respectively at points $P_0$, $P_1$, $P_2$.

Each condition of winding energization corresponds, therefore, to a virtual pole and to a torque waveform: changing the energization condition of a single winding moves the poles from a position to the following one, and shifts the torque waveform by a rotor step.

A method for obtaining continuous rotation of the motor in the direction of arrow FA is, therefore, to change the energization of the windings in order to maintain a positive torque. If the motor is standing still in position $P_0$ under the action of pole $M_{00}$, which supplies the holding torque $C_{00}$, it will start to rotate if the pole moves, from $M_{00}$ to $M_{10}$, that is, if the torque acting on the rotor changes from $C_{00}$ to $C_{10}$, which has a maximum positive value at position $P_0$. The rotor remains subject to the action of this pole for the first half motor step, that is, until position $P_{01}$ is reached: then the energization of the windings is changed to move the pole to $M_{11}$, supplying the torque $C_{11}$, for one rotor step, that is, up to position $P_{12}$, and so on. The shape of the resulting torque waveform is shown by the thick continuous line in diagram CP of FIG. 1.

From the above table it appears that the succession of binary values $a$ and $b$ shown in section 2 causes the switches to open and close so, as to obtain the sequence of winding energization which provides the above described torque waveform. The sequence of these binary values is shown by diagrams $S_1$ and $S_2$ wherein $S_1$ is a signal for controlling the switches I and I', according to the values of variable $a$; and $S_2$ is a signal for controlling the switches J and J', according to the values of variable $b$.

For obtaining a braking torque the sequence of the pole positions must be so chosen as to provide a negative torque. To this effect, the windings will be so energized, as to have for example torque $C_{00}$ acting on the rotor from point $P_{01}$ to point $P_{12}$; afterward, torque $C_{10}$ up to point $P_{23}$; torque $C_{11}$ up to point $P_{34}$, as shown by the thick dashed line. The diagrams $S'_1$ and $S'_2$ show the waveform of the signal controlling the switches in this case. These values correspond to the inverted values of diagrams $S_1$ and $S_2$, or, to a shifting of these diagrams by two rotor steps.

It must be noted that the operation is symmetrical with respect to the direction of the arrow FI. The switching points, which are determined by a photodisk which rotates integrally with respect to the rotor, follow in the inverted order, that is $P_{34}$, $P_{23}$, $P_{12}$, $P_{01}$, and the sequence of combinations of the signals supplying the accelerating torque in the direction of the arrow FI are shown in diagrams $S'_1$ and $S'_2$, whereas those supplying a braking torque against this motion are shown in diagrams $S_1$ and $S_2$.

It is therefore possible to obtain, by switching the control signals $S_1$ and $S_2$, under command of pulses suitably chosen and depending on the rotational position of a photoelectric disk, each possible sequence of accelerating, braking or holding torque. Thus, a position feedback device is obtained because the torque applied to the motor is made to change in the required manner and at points in time which depend on the positions of the photodisk, that is, of the rotor.

However, to ensure the stopping of the motor precisely at a definite position, it is convenient to add a velocity feedback to this position feedback. In effect, the kinetic energy of the motor, which must be canceled by the braking torque, in order to stop the motor at the required position, depends directly on the speed of the motor, and this speed may by chance have different values for the same position of the rotor, whereas the braking torque depends exclusively on the rotor position. It may therefore happen that the rotor arrives at the stopping position with positive speed, and therefore tends to overshoot, or that it approaches the stop position with a speed insufficient for reaching the same.

This disadvantage is obviated by providing a speed-controlled signal, supplied by means of a monostable multivibrator (one-shot) adjusted for introducing a delay of fixed duration, between one of the pulses, suitably chosen, supplied by the photodisk, and an additional switching signal, which changes the torque applied to the motor, from a braking torque to a holding torque, thus ensuring the stopping of the motor in the required stable position. In general, a plurality of one-shot circuits may be used, each one of them supplying a signal of definite duration, which starts in coincidence with a selected photodisk pulse, while suitable circuits are provided to check at proper intervals, whether the time intervening between the photodisk pulses is longer or shorter than the duration of the signal, so that the required additional switching signals are controlled by the speed of the motor.

Figure 2:
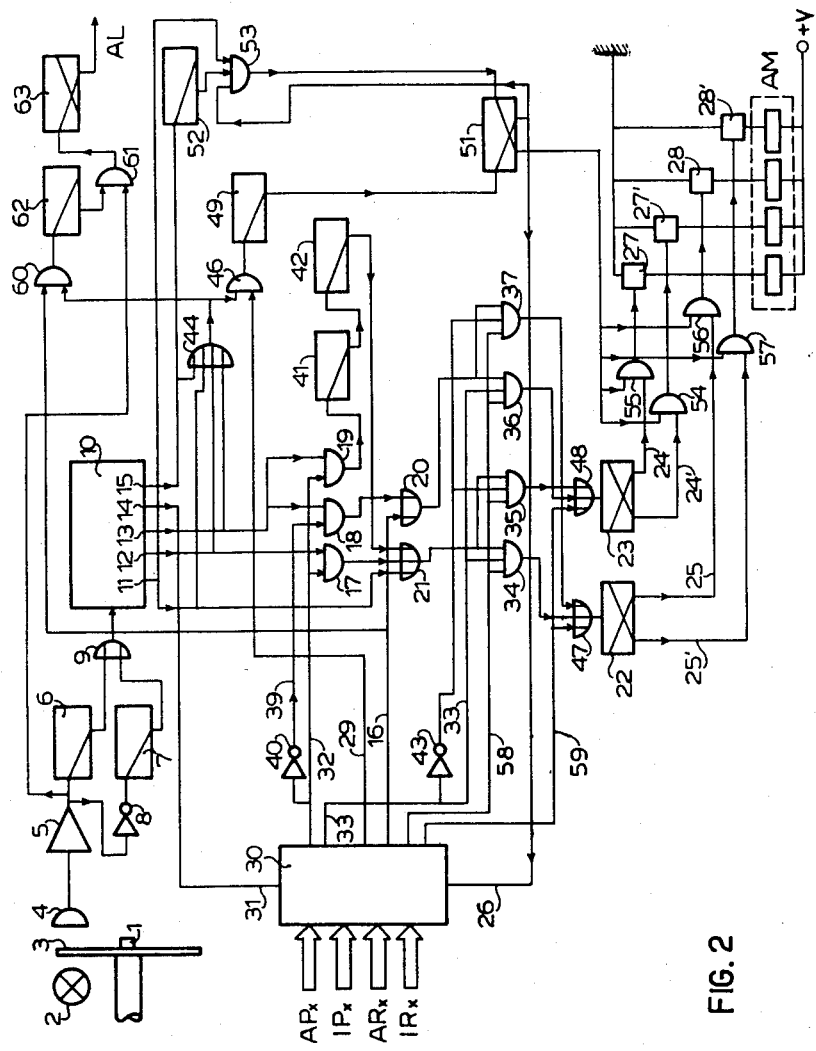
FIG. 2 is a simplified block diagram of the logic circuit according to the invention.

FIG. 2 shows the simplified logic diagram of a preferred embodiment. In the drawing are indicated, by proper symbols, specific elementary circuits such as amplifiers, inverters, AND or OR gates, bistable multivibrators commonly called flip-flops, and monostable multivibrators commonly called one-shots.

Figure 3:
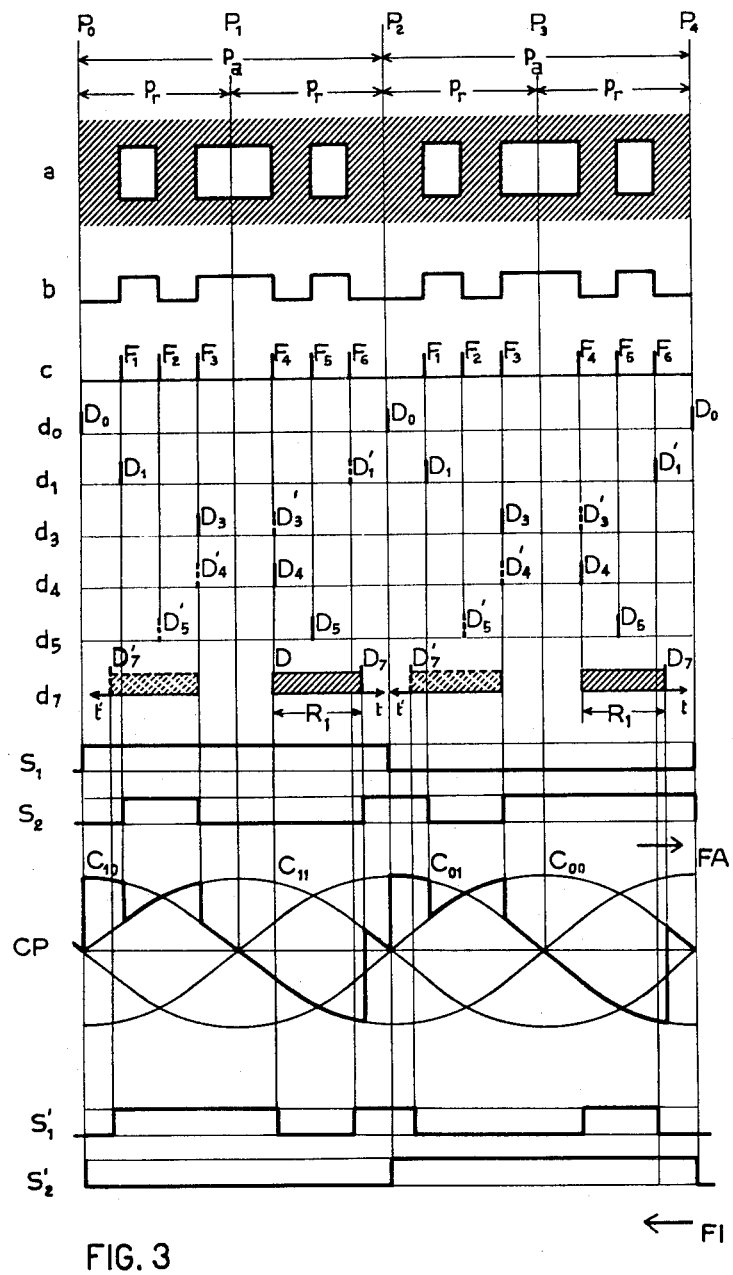
FIG. 3 depicts schematically the arrangement of the photodisk windows, the sequence of the control signals and of the torque waveforms in the case of step-by-step motion according to the preferred embodiment.

FIG. 3 shows the shape and succession of various pulses, signals and torque waveforms, in case of the step-by-step operation.

Referring to FIG. 2, the shaft 1 of the stepping motor has a photoelectric disk 3 rigidly mounted on its extremity, and interposed between a light source 2, preferably a solid state photoemitter and a light detector 4, preferably a photodiode or a phototransistor. A circular track of transparent windows separated by opaque sectors, causes the photodetector to be alternatively illuminated or obscured during the rotation of the disk. The pattern of the track is represented, in rectilinear form, for a sector equal to four rotor steps, in diagram (a) of FIG. 3. According to the preferred embodiment four rotor steps $P_r$ equal two subsequent travel steps $P_a$. In the instance where the motor is used to move the printing carriage of a serial printer, the travel step $P_a$ is the print pitch, that is, the interval between two subsequent print positions. The allowed stop positions for the motor are these, like $P_0$, $P_2$, $P_4$ ... in which the photodetector is obscured. This arrangement allows for immediately distinguishing any accidental stopping in not-allowed positions, such as $P_1$, and $P_3$, as will be explained hereafter.

The electrical signals, supplied by the photodetector 4 as a consequence of the alternance of illumination and obscurity during the rotation of the motor, are amplified and squared by an amplifier 5 and applied directly to a one-shot 6 and, after inversion by an inverter 8 to a one-shot 7. The one-shots 6 and 7 are driven by the rise front of the signals applied to their input, and supply a positive pulse of constant and very short duration in respect to the duration of the input signals. The order of magnitude of the latter is measured in some milliseconds, that of the former in some microseconds.

The output leads of the one-shots 6 and 7 are connected to the inputs of an OR gate 9: its output lead supplies a succession of pulses $F_1$ to $F_6$ as shown in diagram (c) of FIG. 3, each pulse coinciding with the passing of either the leading edge or the trailing edge of a transparent window in front of the photodetector. It will be remarked that the window track is so designated, that the intervals between $F_1$, $F_2$, $F_3$ and between $F_4$, $F_5$, $F_6$ measure one-fourth of a rotor step, whereas the intervals between $F_3$ and $F_4$, and the interval between $F_6$ and $F_1$ are equal to ½ rotor step.

These pulses are applied to the input of a counter-decoder circuit 10, comprising a modulo-six counter, and a decoder, so designed, that output pulses, practically coincident in time and in duration with selected input pulses, are supplied to individual output leads. By the described embodiment, five output loads are used, that is, output leads 11, 12, 13, 14 and 15. The first three leads supply respectively the pulses $D_1$, $D_3$ and $D_4$ coincident with the pulses $F_1$, $F_3$, $F_4$ as shown in diagrams $d_1$, $d_3$, $d_4$, of FIG. 3. These pulses are active in the step-by-step mode. Output 14 carries the pulse $D_5$ which is used only for counting the performed steps. The output 15, which carries the pulse $D_6$, is active only during the slew mode, as will be described hereafter.

A logical control circuit 30 is provided for receiving four commands for the operating mode, as symbolized by the input arrows indicated respectively by AP$x$, IP$x$, AR$x$, IR$x$. Command AP$x$ causes the step-by-step forward motion; command AR$x$ the slew forward motion, command IP$x$ the step-by-step backward motion, and IR$x$ the slew backward motion. In all cases, the symbol $x$ will indicate the number of steps to be executed, or will control special operations, such as, in the case where the motor operates the printing carriage of a serial printer, the rapid reaching of the start-of-line or of the end-of-line position.

In the general case, wherein the symbol $x$ indicates a number of steps, its value is registered in a proper memory device being part of the control circuit 30, which will comprise a counter for counting the performed steps, that is the number of pulses $D_5$ received at an input lead 31.

The output lead 32 of the logic control circuit 30 supplies the binary values controlling the mode of operation. For instance, the step-by-step mode will be caused by a binary value ONE on an output lead 32, and the slew mode will be caused by a binary value ZERO on the same lead. By means of an inverter 40, on lead 39 the correspondence between modes and binary values is inverted.

The binary values on lead 33 will control the "forward" or "backward" motion. For instance, forward motion will take place if a binary value ONE is on output lead 33, and the backward motion in the opposite case. On lead 38, the effect of inverter 43 on lead 36 the correspondence between direction of motion and binary values is inverted.

On output lead 16 the control circuit 30 may supply a pulse $D_0$ for starting the motor. This pulse is represented in diagram $d_0$ of FIG. 3. The operation of input leads 26 and of output leads 58, and 59 will be explained as the description proceeds.

Among the pulses supplied by the counter-decoder 10, the pulse $D_1$, on output lead 11, is applied to a first input of an OR gate 21. The pulse $D_3$, on output lead 12, is applied to a first input of AND gate 17, which has its second input connected to output 32 of the control circuit 30. This gate, therefore, is enabled in the step-by-step mode, and disabled in the opposite case. Its output is connected to a second input of the OR gate 21. The output lead 13, carrying the pulse $D_4$, is connected to an input of each one of the AND gates 18 and 19. The second input of the gate 19 is connected to the output 32 of the control circuit 30, and is therefore enabled only in the step-by-step mode. The second input of gate 18 is connected to output 30 of the inverter 40, which supplies inverted binary values with respect to those of lead 32. Therefore, the gate 18 is enabled only in the slew mode.

The output of gate 19 is connected to a device for delaying pulses, comprising two one-shots 41 and 42, so connected that the output lead of one-shot 42 supplies a pulse $D_7$ following the pulse $D_4$ after a delay $R_1$ determined by the characteristics of the one-shot 41. The pulse $D_7$ is fed to a third input of the OR gate 21. The time relation between pulses $D_4$ and $D_7$ is shown by diagram $d_7$ of FIG. 3, in which it must be remarked that the distances on the horizontal axis do not represent the angular position of the rotor or the distance covered by the moving member driven by the motor, as in the other diagrams, but represents the time. Therefore, the distance of the pulse $d_7$ from the point indicating the stopping position, such as $P_2$, changes with the speed of the motor: more precisely, $D_7$ approaches $P_2$ or recedes from it according to whether the speed of the motor is higher or lower than the normal speed.

The lead 16, which supplies the pulse $D_0$, and the output of AND gate 18, which is inhibited in the step-by-step mode, are respectively connected to the two inputs of OR gate 20.

The output lead of the OR gate 21 is connected to the first inputs of AND gates 34 and 35 and similarly the output of OR gate 20 is connected to first inputs of AND gates 36 and 37. The second inputs of AND gates 34 and 36 are connected to the lead 33 and the second input of AND gates 35 and 37 are connected to lead 43. The third input of all four AND gates 34, 36 and 37 are connected to a lead 58 on which there is usually a binary ONE. Therefore, in the condition of "forward motion" gates 34 and 35 are enabled, gates 36 and 37 are disabled: the contrary happens in the condition of "backward motion."

Through the OR gates 47 and 48 the outputs respectively of gates 34 and 37, and of gates 35 and 36, and the outputs of the control circuit 30 on lead 59 are respectively fed to the inputs of two flip-flops 22 and 23. On the lead 59 there is usually a binary ZERO.

Flip-flops 22 and 23 are of the type which change states every time a pulse is fed to their single active input. This result may be obtained by using flip-flops of the so called J-K type provided with a clock input, by applying a constant binary ONE level to both inputs J and K and feeding the control pulses to the clock input.

Thus, in the "step-by-step forward motion" condition the AND gates 17, 18, 34 and 36 are enabled. Therefore, the input of flip-flop 22 is reached by pulse $D_0$ through OR gate 20, AND gate 36 and OR gate 47, and the input of flip-flop 23 is reached by pulses $D_1$, $D_3$ and $D_7$ through OR gate 21, AND gate 34, and OR gate 47.

The complementary outputs 24 and 24' and the complementary outputs 25 and 25' of flip-flops 23 and 22 control, through four AND gates 54, 55, 56 and 57 which in step-by-step mode are always enabled, the four switching circuits 27 and 27', 28 and 28', which perform the function of switches I and I', J and J' of FIG. 1; that is, they control the energizing and de-energizing of the motor windings, indicated as a whole by AM in FIG. 2. The switches 27 and 27', 28 and 28' may be implemented in many ways, all well known to those skilled in the art, for instance by using power transistors. The description of the actual circuits provided to accomplish this would be impractical for the purpose of the present patent application, and is therefore omitted.

It is easy to see that the pulse $D_0$ controls the alternative setting and resetting of flip-flop 23, and that pulses $D_1$, $D_3$ and $D_7$ similarly control the flip-flop 22. The sequence of the output signals of the flip-flops is indicated by diagrams $S_1$ and $S_2$ of FIG. 3, wherein the diagram $S_1$ depicts the values of output 24 of flip-flop 23, controlling the switch 27, corresponding to switch I of FIG. 1 and the diagram $S_2$ depicts the values of output 25 of flip-flop 22 controlling the switch 28, corresponding to switch J of FIG. 1. The binary values of outputs 24' and 25' are the inverted values of the output values of leads 24 and 25, and control in a complementary way the switches 27' and 28', respectively corresponding to switches I' and J' of FIG. 1.

Diagram CP of FIG. 3 shows the torque waveform corresponding to different energizing conditions of the windings, as shown also in FIG. 1. The thick solid line indicates the succession of the torque values due to the sequences of state combinations of flip-flops 22 and 23, under control of the sequence of the pulses active in the step-by-step forward motion condition.

As the motor is standing still in the stable position $P_0$, the control signals $S_1$ and $S_2$ are both at ZERO value and the torque is that corresponding to curve $C_{00}$, which ensures a stable equlibrium position. At the arrival of the starting pulse $D_0$, sent by control circuit 30, $S_1$ is switched to the ONE value, the torque curve now effective is $C_{10}$ giving a maximum value at position $P_0$ and the motor accelerates quickly. After an angular displacement equal, for instance, to one-eighth of the travel step (¼ rotor step), the pulse $D_1$ causes $S_1$ to switch to a ONE value, and the torque curve is now $C_{11}$. It may be remarked that the shifting from curve $C_{10}$ to curve $C_{11}$ is made in advance with respect to the point where the curves cross, which should theoretically correspond to the maximum torque value. The advance in shifting takes into account the inductance of the winding and the delay it causes in determining the effective instant of the flux switching in the stator polepieces.

As the motor continues to accelerate, the pulse $D_3$ causes $S_2$ to revert to ZERO, and the torque shifts back to curve $C_{10}$. This torque is positive, but decreasing and in correspondence with the unstable position $P_1$ becomes negative, thus starting the braking action which increases as the stop position $P_2$ approaches. In the immediate proximity of this position, and more precisely, at a predetermined time delay $R_1$ after the pulse $D_4$, the pulse $D_7$ causes $S_2$ to resume the ONE value. The active torque curve is now $C_{11}$, which provides a holding torque for the stable position $P_2$. As it will be better explained hereafter, the fixed delay $R_1$ has a partially compensating effect on the chance variations in the speed of the motor. If the speed is too high, $R_1$ increases with respect to the measure, in time units, of the travel step $P_a$ and the pulse $D_7$ is therefore delayed, and the braking action prolonged. The contrary happens if the speed is too low.

The motor stops on position $P_2$, with $S_1$ and $S_2$ both having the value ONE. A new start pulse $D_0$, sent by the control circuit 30 switches $S_1$ to a ZERO value. Curve $C_{01}$, which provides a maximum positive value at $P_2$, is now the active torque curve until pulse $D_1$ switches $S_2$ to ZERO. The following pulses $D_3$ and $D_7$ provide the subsequent switching of $S_2$ so that the effective torque values vary in the same way as described above. At the end of the second travel step, the motor stops in position $P_4$, with $S_1$ and $S_2$ both having a ZERO value as in the initial position $P_0$, and the sequence of pulses may be repeated.

The condition of "step-by-step backward motion" differs from the preceding inasmuch as the AND gates 34 and 36 are disabled, and the AND gates 35 and 37 are enabled. Therefore the pulse $D_0$ is fed to flip-flop 22 and pulses $D_1$, $D_3$ and $D_7$ are fed to flip-flop 23. The sequence of switching signals is shown by diagrams $S'_1$ and $S'_2$ of FIG. 3, read from right to left, as indicated by the arrow FI. Given the symmetry of the transparent windows of the photodisk with respect to the middle line of each travel step, the operation takes place as described above, remarking that pulse $D_0$ switches signal $S'_2$ and the other pulses switch the signal $S'_1$.

As the motor rotates backward, the pulses $F_1$ to $F_6$ follow in reverse order with respect to that of diagram (c); however, as the pulses are distributed to the output leads in the same timing order as in the preceding case, the operation is fully symmetric and does not require changes in the circuitry. The diagrams $d_1$ to $d_7$ indicate by dashed lines that pulses $D'_1$, $D'_3$, $D'_4$, $D'_5$ and $D'_7$ as supplied by the backward rotation. Also, the direction of the time scale is reversed, as shown by the position of pulse $D'_7$ with respect to $D'_4$. In the slew motion mode according to a preferred embodiment, the control device 30 (FIG. 2), by means of a binary value ZERO on lead 32 and binary value of ONE on lead 39, inhibits the AND gates 17 and 19 and enables AND gate 18, so that all of pulses supplied by the counter decoder 10 only $D_1$ and $D_4$ reach the flip-flops 22 and 23.

The outputs 11, 12, 13 and 15 are, in addition, connected to an OR gate 44 whose output is connected to an AND gate 46 controlled by a special output 29 of the control unit. In the condition of slew motion, the gate 46 is enabled, and the pulses $D_1$, $D_3$, $D_4$, $D_6$ are fed to the input of a one-shot 49 adjusted to a predetermined operation time $R_2$. When the time interval between two subsequent pulses, which follow at the angular distances of half a rotor step, is lower than the time $R_2$, the one-shot is maintained in the "up" state; when the interval between one of these pulses and the following is higher than this value, the one-shot returns to the "down" state and by its inverted output causes the setting of a flip-flop 51. The inverted output of this flip-flop controls the AND gates 54, 55, 56 and 57 interposed between flip-flops 22 and 23 and the switches 27, 27', 28, 28' which in turn control the energizing of the motor windings.

The output 15 of the counter decoder 10, which supplies the pulse $D_6$, is connected to the input of a one-shot 52, in such a way that this pulse can set it in the "up" state. Its inverted output is connected to an input of an AND gate 53 having three inputs: one of the remaining inputs is connected to the direct output of flip-flop 51, and the other one to lead 11 which supplies the pulse $D_1$: the output of this AND gate 53 is connected to the reset input of flip-flop 51.

Figure 4:
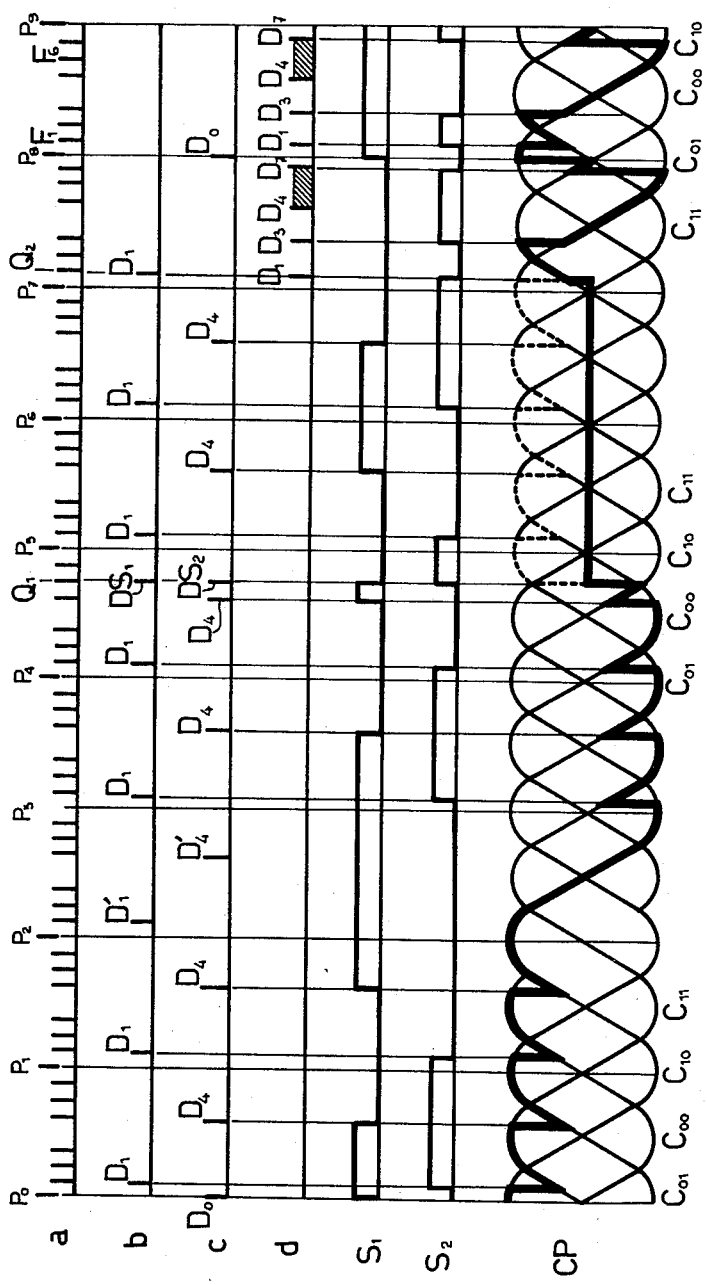
FIG. 4 depicts schematically the sequence of the control signals and of the torque waveforms, in the case of slew motion, according to the preferred embodiment.

FIG. 4 shows the different waveforms of the switching signals $S_1$ and $S_2$ of the torque curves in the case of a forward slew motion: also in this case the values on the horizontal axis are proportional to the rotation angle of the rotor. Four different stages may be considered: the first one, of acceleration or rapid forward motion, from points $P_0$ to $P_2$; a second one, of braking action, and strong deceleration ($P_3$ to $Q_1$); a third one, of de-energization, and low deceleration (from $Q_1$ to $Q_2$); and, at least, a step-by-step motion stage, to the final position. Due to drawing requirements, in FIG. 4 the number of steps assumed to be comprised in each stage is very small: in reality, it will be larger in most cases.

The drawings also show: a) the pulses $F_1$ to $F_6$ of each step, as produced by the photodisk: b) and c) respectively the pulses $D_1$ and $D_4$, coincident with pulses $F_1$ and $F_4$.

Diagrams $S_1$ and $S_2$ show the switching sequences of flip-flops 23 and 22 of FIG. 2, and diagram CP the torque waveforms.

In the first stage referred to above, the control device enables only AND gate 18 and inhibits, as previously stated, AND gates 17 and 19, so that only pulses $D_1$ and $D_4$ are supplied to flip-flops 23. The start pulse supplied directly by the control device 30, acts on the flip-flop 23 so that the torque is shifted to curve $C_{10}$, then both flip-flops 22 and 23 are alternatively set and reset, the first one under control of pulses $D_4$ and the second under control of pulses $D_1$, so that the sequence of signals $S_1$ and $S_2$ maintains a positive torque, shifting in succession from curve $C_{10}$ to curve $C_{11}$, to curve $C_{01}$, to curve $C_{00}$ and so on, as shown by diagram CP of FIG. 4. The motor accelerates until it reaches the maximum speed when the positive torque is fully compensated by the friction torque.

It must be remarked that in addition to the above, in this condition the pulse $D_5$ acts on the counter included in the control circuit 30, thus keeping account of the travel steps performed.

At a predetermined number of steps in advance of the final position, the control circuit sends a command signal to initiate the decelerating stage, changing from the sequence producing a positive torque to a sequence, controlled by the same pulses $D_1$ and $D_4$, which provides a negative torque. To this effect it is sufficient, for instance, to cancel the pulses indicated by $D'_1$ and $D'_4$ in FIG. 4 during a travel step. This may be accomplished by a ZERO value sent at a proper time and for sufficient duration on lead 33, thus inhibiting AND gates 34 and 36. The torque then follows the curve $C_{10}$ until it reaches and passes the negative maximum value. Afterwards, the switching of signals $S_1$ and $S_2$ is resumed, and the torque follows the curves $C_{11}$, $C_{01}$, $C_{00}$, exerting a strong braking action.

At the beginning of the braking stage, gate 46 (FIG. 2) is activated, thus allowing the pulses $D_1$, $D_3$, $D_4$, $D_6$ to reach the input of univibrator 49. These pulses, as stated hereinbefore are separated by time intervals corresponding to one-fourth of a rotor step, that is, one-eighth of a travel step. These pulses hold the one-shot 49 in the "up" state as long as this interval is lower than the delay time of the one-shot. When, due to the strong deceleration, this time interval becomes longer than the delay time, the one-shot returns to the "down" state, and its output sets the flip-flop 51. The inverted output of the same now supplies a ZERO binary value to AND gates 54, 55, 56 and 57 inhibiting them and de-energizing the motor windings. The direct output of flip-flop 51, connected to the control circuit, predisposes the return to the slew forward motion condition, for instance by sending a supplementary pulse DS on lead 59, which acts on both flip-flops 22 and 23, and allows the switching of signals $S_1$ and $S_2$ to resume the proper sequence of the accelerating mode. However, this has no effect on the motor as the windings are de-energized. FIG. 4 shows, by a thick dashed line, the virtual diagram of the torque variation if the motor were energized. The motor is now subject only to the friction torque, and rotates by its inertia, decelerating slowly.

During this stage, the output of flip-flop 51 enables the AND gate 53. The one-shot 52 is periodically set in the "up" state by the pulse $D_6$ applied at its input, and returns to the "down" state after a predetermined time.

As long as the one-shot 52 is in the "up" state, its inverted output inhibits the AND gate 53. The pulse $D_1$, which follows $D_6$ at an angular interval equal to one-eighth of a travel step, is supplied to the third input lead of gate 53. When the rotation of the motor is so slowed down, that the one-shot returns to the "down" state before the arrival of the pulse $D_1$, the AND gate 53 is enabled to transmit this pulse, which therefore reaches the reset input of flip-flop 51, resetting the same and restoring the energizing of the motor windings. The torque varies according to the waveform determined by the values $S_1$ and $S_2$ and, as shown, follows curve $C_{00}$. The direct output of flip-flop 51, acting through input 36 of the control device, restores the step-by-step mode. Thus, the pulses $D_1$, $D_3$, $D_4$ and $D_7$ are now active, and as indicated by diagram (d) of FIG. 4, control the switching, in the previously explained manner, of the signal $S_2$, while the control device supplies at each travel step, the pulse $D_0$ controlling $S_1$. The last steps before stopping are therefore accomplished by the step-by-step process, which ensures that the motor stops in the required position.

Given the symmetry of the system, it is self-evident that the operation of slew backward motion can take place in exactly the same way. To accomplish this, it is sufficient to inhibit the AND gates 34 and 36 and to enable AND gates 35 and 34, by applying a ZERO level to lead 33 and therefore a ONE level to lead 58. Then the pulses $D_0$ and $D_4$ act on flip-flop 22 and pulse $D_1$ on flip-flop 23. As shown in FIG. 2, the output lead of the OR gate 44 is also connected to the input of a one-shot 62, adjusted for a relatively high delay time for instance some milliseconds. The starting pulse $D_0$ is also supplied to this one-shot through the OR gate 60. The inverted output is connected to the input of AND gate 61, having its other input connected to the output of the amplifier 50. This output lead is at a ZERO value if the photodetector 4 is obscured and at a ONE value when it is illuminated.

The output of this AND gate is connected to the input of a flip-flop 63. The starting signal $D_0$ and the following signals supplied by the OR gate 44 hold the one-shot 62 in the "up" state and therefore its inverted output inhibits the AND gate 61.

When the motor stops, some milliseconds after the last received pulse, the one-shot 62 returns to the "down" state, and its inverted output enables the gate 61. If on the other input of this gate there is a ONE value, that is, if the disk has stopped in a position where the photodetector is illuminated, the flip-flop 63 is set, and its output gives out an alarm signal to indicate that the motor has stopped in a false position. An arrangement may also be provided such that the alarm signal triggers the sending on a supplementary pulse for letting the motor advance by a rotor step to reach the correct stop position.

Considering once again the case of the step-by-step operation, it may be remarked that in some known devices the pulse controlling the switching from the braking torque to the holding torque is supplied by means of a one-shot set in the "up" condition at the beginning of each step. The regulating action needed to compensate for the chance variations of speed depends only on the operation time of this one-shot.

According to the present invention, on the contrary, and in a general way, the final switching pulse follows after a delay $R_1$, a prefixed pulse suitably chosen among those supplied by the photodisk, between the beginning and the end of each step. Thus, two variables are available for conveniently adjusting the regulating action in dependence of the speed variations.

Figure 5:
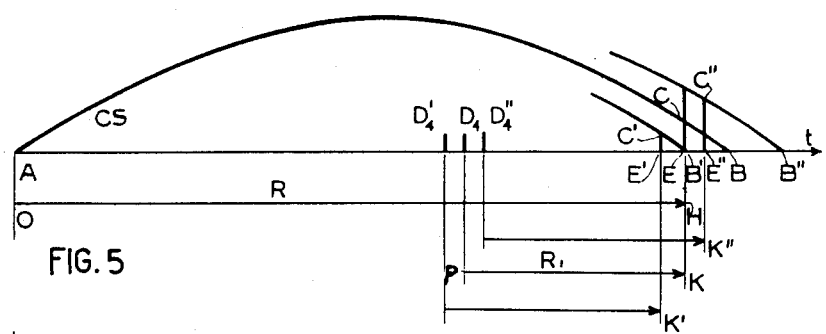
FIG. 5 shows schematically the waveform of the holding torque, the related control signals and their time relationship in the case of variation of the motor speed, according to the invention.

Referring to FIG. 5, the segment AP indicates the time needed for a travel stop, and the curve CS shows the variation of the holding curve for stopping the motor at the preset instant B. The shape of the curve is purely illustrative as only its end portion is relevant. OH indicates the constant time delay of a one-shot set in an "up" state at instant A, which at instant H returns to the "down" state, supplying a switching pulse for switching on the holding torque. The segment of curve CB shows how the holding torque varies. This holding torque must be barely sufficient for bringing the rotor to the rest position B without overshooting it. If there is a chance increase or decrease of the speed, which causes the duration of a step to become respectively AB' or AB'', in the first case the holding torque is vanishing, in the second case the holding torque may be too strong.

According to the invention, the one-shot supplies the delay PK starting from the time instant when pulse $D_4$ is supplied. Firstly, it must be remarked that, as PK is smaller than OH, the delay precision, if components of the same quality are employed, is higher in the first case than in the second case. Secondly, if the time needed for a step is reduced from AB to AB', or is increased to AB'', also the time interval $AD_4$ decreases or increases proportionally, and becomes respectively $AD'_4$ and $AD''_4$, where $D'_4 D_4$ and $D''_4 D_4$ are, in the considered case, five-eighths respectively of B' B and B'' B. Correspondingly, point K' will be anticipated, and respectively point K'' will be delayed in the same measure: as a result, the torque C' E', while remaining smaller than CE, will still be sufficient, and the torque C'' E'', even if higher than CE, will not be too strong. It has been found that by suitably choosing the starting pulse and the delay time of the one-shot, by calculation or by experiment, the best conditions for obtaining the most efficient speed regulation are reached, and the rotor may be brought to the stable position most rapidly, but without oscillations.

In the described example, a travel step comprises two rotor steps. However, the number of rotor steps comprised in a travel step may be different, according to the required operation.

Figure 6:
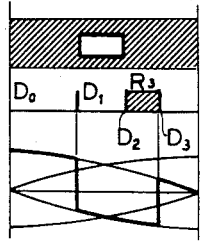
FIG. 6 depicts schematically an arrangement of the photodisk windows, the related control signals and the torque waveform, in the case where the travel step comprises a single motor step.
Figure 7:
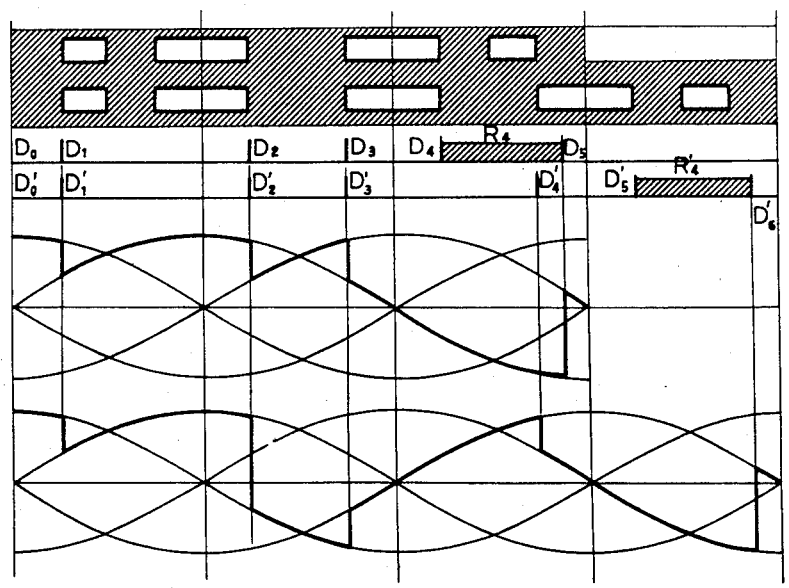
FIG. 7 depicts schematically the arrangement of two window tracks in a photodisk and the related control signals and torque waveforms in the case where the travel step may be changed to comprise, at will, three or four motor steps.

FIG. 6 shows a possible arrangement for the track of a photoelectric disk, the pulse pattern and the torque waveform in the case of the travel step corresponds to a single rotor step.

This arrangement provides, for instance, a single window per step, of the length of one-fourth of step. Therefore, in addition to the start pulse $D_0$, only two photodisk pulses are available, $D_1$ and $D_2$. One of these, for instance $D_2$, may be used for operating a one-shot which will supply, after a delay $R_3$, a pulse $D_3$ for switching on the holding torque. As the pulse $D_2$ is used for counting the steps, the torque curve is changed only two times, under control of $D_1$ and $D_4$. It is clear that the torque variation will be less favourable to a rapid rotation and a smooth stopping than in the preceding case.

FIG. 6 shows a possible arrangement in the case where it is desired to change at will the length of the travel step, to let it comprise, for instance, three or four rotor steps. The photoelectric disk will be provided in this case with two window tracks, one comprising three rotor steps, and the second four rotor steps, per travel step. In both cases the symmetry condition with respect to the middle line of the travel step, is maintained to allow the reverse of the motion, as well as the requirement that, in with stable positions not allowed for stopping the motor, the photodetector is illuminated, whereas it obscured in the allowed positions. Obviously, this relation may be reversed. In both cases a one-shot, which may also be the same for both different operating conditions, provides a fixed delay $R_4$ or $R'_4$, after which a final pulse is supplied, for switching the torque curve from braking to holding.

The arrangement and the length of the transparent windows may be selected in the way that calculation and experiments may show to be the most convenient. The signals controlling the energization of the motor windings are subjected to pulses supplied by the first or by the second track according to whether the travel step should comprise three or four rotor steps.

If reversal of the motion is not wanted, the symmetry requirement for the window tracks is eliminated, and there is greater freedom in the design of the photodisk.

It is intended that a number of additions and modifications may be carried out with reference to the arrangement of the circuital means and the operation of the device by anyone skilled in the art, without departing from the spirit and scope of the invention. In particular, in the case of slew motion, the braking stage may be obtained by using different pulse sequences, and possibly, abolishing the de-energization stage, or interleaving this stage with partial stages of acceleration and braking in a way that may be found to be the most convenient, such different pulse sequences being easily obtainable by using command signals directed to suppress or to add pulses at predetermined instants by means of the leads 58 and 59 of FIG. 2.

What is claimed is:

1. A closed loop control device for a stepping motor having windings and a rotor movable in rotation through a plurality of elementary steps between a plurality of stable positions, said control device comprising means responsive to the rotated position of said rotor for generating a plurality of primary triggering pulses when said rotor is in rotational movement between one stable position and a subsequent stable position, means responsive to said triggering pulse generating means for generating additional pulses each additional pulse following a predetermined time interval after a selected one of said primary pulses, and switching means responsive to said primary pulses and said additional pulses for switching the energizing currents of the motor windings to control the rotational motion of the rotor and its stopping in predetermined stable positions.

2. The control device for stepping motors of claim 1, wherein the means for generating primary pulses comprises a photoelectric disk integral with the rotor of the motor, provided with at least one concentric track of transparent windows alternated with opaque intervals, photoemitter means and photodetector means one provided on each side of said disk in alignment with said windows to provide said primary pulses in correspondence with the transitions from the state of illumination to the state of obscurity and vice versa of said photodetector means.

3. The control device of claim 2 wherein subsequent stable positions of the rotor each correspond alternatively with one of said transparent windows and one of said opaque intervals.

4. The control device of claim 1 wherein at least two of said plurality of stable positions are allowable rotor stopping positions of said control device.

5. The control device of claim 2 wherein the plurality of stable positions of said rotor comprise allowable and unallowable stopping positions of said rotor control device and wherein said stable positions of said rotor which are stopping positions are indicated by opaque intervals of said track and stable positions of said rotor which are not stopping positions are indicated by transparent windows.

6. The method of controlling a stepping motor having windings and a rotor movable in rotation through a plurality of elementary steps between a plurality of stable positions comprising the steps of generating a plurality of primary triggering pulses in response to the rotational position of said rotor during rotational movement of said rotor between one stable position and a subsequent stable position, generating additional pulses in response to said primary triggering pulses, each of said additional pulses being generated in response to a selected one of said primary triggering pulses, delaying the additional pulse for a predetermined time interval after the respective selected primary triggering pulse and applying said primary pulses and said additional pulses to the motor energizing circuit to switch the energizing currents of the motor windings to control the motion of the rotor and its stopping in predetermined stable positions.

* * * * *